United States Patent
Yankovitz et al.

(10) Patent No.: US 7,862,873 B2
(45) Date of Patent: Jan. 4, 2011

(54) BIODEGRADABLE IRRIGATION PIPE

(75) Inventors: Tsipora Yankovitz, Kazir (IL); Abraham Schweitzer, D.N. Negev (IL)

(73) Assignee: Netafim, Ltd., Tel Aviv (IL)

( * ) Notice: Subject to any disclaimer, the term of this patent is extended or adjusted under 35 U.S.C. 154(b) by 462 days.

(21) Appl. No.: 12/030,889

(22) Filed: Feb. 14, 2008

(65) Prior Publication Data

US 2008/0191464 A1 Aug. 14, 2008

Related U.S. Application Data

(60) Provisional application No. 60/901,109, filed on Feb. 14, 2007.

(51) Int. Cl.
*B29D 22/00* (2006.01)
*B29D 23/00* (2006.01)
*B32B 1/08* (2006.01)

(52) U.S. Cl. ............... 428/36.91; 428/35.7; 428/36.9; 428/421; 428/422; 138/124; 138/125; 138/177

(58) Field of Classification Search ............... 428/35.7, 428/36.9, 36.91, 421, 422; 138/124, 125, 138/177

See application file for complete search history.

(56) References Cited

U.S. PATENT DOCUMENTS

| 3,590,528 A | 7/1971 | Shepard et al. |
| 3,774,850 A | 11/1973 | Zeman |

FOREIGN PATENT DOCUMENTS

| EP | 1512709 | 3/2005 |
| WO | WO 0012627 | 3/2000 |
| WO | WO 0055236 | 9/2000 |

OTHER PUBLICATIONS

"Colonization, biofilm formation and biodegradation of polyethylene by strain of *Rhodoccus ruber*" by O. Gilan et al; Applied Microbial Biotechnology 2004, vol. 65: pp. 97-104.

"Biodegradation of polyethylene by the thermophilic bacterium *Brevibacillus borstensis*" by D. Hadad et al.; Journal of Applied Microbiology 2005, vol. 98: pp. 1093-1100.

International Search Report from PCT/IL2008/000193, dated Nov. 24, 2008.

*Primary Examiner*—Michael C Miggins
(74) *Attorney, Agent, or Firm*—Womble Carlyle

(57) ABSTRACT

An Irrigation pipe having a wall comprising: a core layer formed from a biodegradable material; and at least one relatively non-biodegradable protective layer formed on the core layer.

15 Claims, 1 Drawing Sheet

BIODEGRADABLE IRRIGATION PIPE

RELATED APPLICATIONS

The present application claims benefit under §119(e) of U.S. Provisional Application 60/901,109 filed Feb. 14, 2007.

FIELD

The invention relates to irrigation pipes that are useable for a desired length of time after which they biodegrade relatively rapidly.

BACKGROUND

Irrigation systems that deliver water, often containing plant nutrients, pesticides and/or medications, to plants via networks of irrigation pipes are very well known. Water from the pipes is delivered to the plants though an array of water outlet ports formed in the pipes and/or various types of emitters or drippers that are installed on or integrated inside the pipes. Typically, a network of irrigation pipes used to irrigate a field crop is laid down in a field in which the crop is grown at the beginning of the crop growing season and removed from the field at the end of the season. The same irrigation pipes are generally used repeatedly for a number of growing seasons until damage and wear renders the pipes inefficient for use at which time they are discarded.

Irrigation pipes are conventionally made from non-biodegradable petroleum based plastics such as polyethylene or polypropylene. As a result, conventional irrigation pipes that are discarded are generally not readily recycled into the environment and add to pollution stress of the environment. In addition, because petroleum is a non-renewable raw material, it is expected that raw material costs for producing irrigation pipes from petroleum-based plastics will increase.

U.S. Pat. No. 3,774,850 describes an irrigation "tube" that is formed from a "biodegradable, organic polymer composition which will decompose at the end of a growing season of a particular type of plant with which the tube is used." The patent considers that "there are many biodegradable polymers and compositions from which the described irrigation pipes may be formed". However, the patent notes only a composition "disclosed in the U.S. Pat. No. 3,590,528 entitled, "Decomposable Polybutene-1 Agricultural Mulch Film" issued to Thomas H. Shepard Jul. 6, 1971." Nor does the patent describe how the composition is configured to "decompose at the end of a growing season of a particular type of plant with which the tube is used." It is noted that European norm EN 13432 defines characteristics a material must have in order to be claimed as "compostable". Polybutene-1 does not appear to have the characteristics.

On the other hand, the patent does indicate that, "It is also preferred that the tubes . . . be formed so that they are sufficiently thin as to be capable of being broken up easily at the end of the growing season utilizing conventional agricultural equipment such as is utilized to plow under grown plants or as to otherwise till or cultivate the soil. This feature of making these tubes so that they can be easily broken up in this manner is considered important in alleviating the necessity for recovery operations." The breaking up forms pieces that are more readily biodegraded as the patent notes: "When a tube as herein described is formed out of a bio-degradable material the breaking up and plowing under of the tube is considered to facilitate bio-degration (sic) of the tube at the end of a growing season."

SUMMARY

An aspect of some embodiments of the invention relates to providing a biodegradable irrigation pipe.

An aspect of some embodiments of the invention relates to providing a biodegradable irrigation pipe formed from a renewable material.

In accordance with an aspect of some embodiments of the invention, a biodegradable irrigation pipe is formed having a pipe wall comprising a plurality of layers. Optionally, the layers comprise a core layer sandwiched between inner and outer protective layers. In an embodiment of the invention, the core layer provides body and mechanical strength to the irrigation pipe and is formed from a biodegradable material, which degrades relatively quickly when exposed to degrading elements such as water, wet soil and/or heat. Biodegradable materials suitable for the practice of the invention are, by way of example, polymers based on renewable sources such as PLA, modified PLA, plasticised PLA, PLA copolymers, starch copolymer, thermoplastic starch, PHA and/or polymerized seed oils or polymers based on fossil sources such as aliphatic polyesters polymers, aliphatic/aromatic polyesters copolymers. The noted materials may be used by themselves or in combinations of two or more of the materials to form the core layer. Optionally, the core biodegradable layer comprises a plurality of core sub-layers, each formed form a different biodegradable material.

The protective layers are relatively non-degradable and protect the core layer from degrading elements until their integrity is breached, after which the irrigation pipe biodegrades relatively rapidly. In accordance with an embodiment of the invention, the protective layers are breached because of an action undertaken by a user of the pipe.

Various materials and combinations of material may be used to form the protective layers in accordance with an embodiment of the invention. Optionally, the protective layers are thin layers formed from a suitable inorganic material such as titania or silica. In some embodiments of the invention, the protective layers have a form of a hydrophobic or water repellent coat. The coat, by way of example, may include hydrocarbon such as polyethylene, fluoropolymer such as PTFE, silicon or other siloxanes or silanes, acrylic. Optionally, the protective layers rely at least in part, on a hydrophobic Lotus-effect to protect the core layer whereby the protective layers prevent wetting of the core layer. Optionally a hydrophobic Lotus-effect layer is formed by impregnating the surfaces of the core layer with wax nanoparticles, for example lotusspray marketed by BASF. In some embodiments of the invention, hydrophobic Lotus-effect layers are formed from Silclean® 3700, a silicone-modified crosslinkable acrylate marketed by BYK-Chemie.

In accordance with some embodiments of the invention, a protective layer is breached by mechanically stressing the irrigation pipe, for example by plowing up the pipe to break it up and leaving pieces of the pipe in the soil. In accordance with some embodiments of the invention, at least the core layer is compostable in accordance with European norm EN 13432. In accordance with some embodiments of the invention, the protective layers are breached by treating the irrigation pipe with a material or bacteria that destroys the protective layers. For example, a polymer protective layer may be destroyed by treating the irrigation pipe with bacteria that consumes the polymer. If the polymer is formed from polyethylene, a *Rhodococcus* ruber bacteria or *Brevibaccillus Borstelensis* bacteria may be used to destroy the protective layer. The ability of these bacteria to consume polyethylene is discussed respectively in an article entitled "Colonization, biofilm formation and biodegradation of polyethylene by strain of *Rhodoccus* ruber" by O. Gilan et al in "Appl. Microbial Biotechnology"; 2004, 65: 97-104 and in an article "Biodegradation of polyethylene by the thermophilic bacterium *Brevibacillus borstensis*" by D. Hadad, et al; Journal of Applied Microbiology; 2005, 98, 1093-1100. The bacteria are optionally applied by flowing a solution comprising the bacteria through the irrigation system, or by contacting the irrigation pipe with the bacteria in a composting site.

There is therefore provided in accordance with an embodiment of the invention an irrigation pipe having a wall comprising: a core layer formed from a biodegradable material; and at least one relatively non-biodegradable protective layer formed on the core layer. Optionally, the core layer comprises a plurality of sub layers formed from different bio-degradable materials. Optionally, the at least one protective layer comprises two protective layers.

In some embodiments of the invention, the core layer is formed from at least one material from the group of materials consisting of: PLA; modified PLA; plasticised PLA; PLA copolymers; starch copolymer; thermoplastic starch; PHA; polymerized seed oil; an aliphatic polyester polymer; and/or an aliphatic/aromatic polyester copolymer.

In some embodiments of the invention, the at least one protective layer is formed from at least one material from the group of materials consisting of: a polyolefin, a fluoropolymer, a siloxane, an acrylic and/or a polyester. Optionally, the polyolefin comprises a polyethylene (CH3-(CH2)n-CH3). Optionally, the fluoropolymer comprises PTFE (CF3-(C2F4)$_n$-CF3). In some embodiments of the invention, the siloxane comprises dimethylsiloxane (SiO(CH3)3-(SiO2(CH3)2)n-(SiO(CH3)3).

In some embodiments of the invention, the core layer has a thickness greater than about 100 microns. In some embodiments of the invention, the core layer has a thickness less than about 200 microns.

In some embodiments of the invention, the at least one protective layer has a thickness greater than about 10 microns. In some embodiments of the invention, the at least one protective layer has a thickness less than about 50 microns.

BRIEF DESCRIPTION OF FIGURES

Non-limiting examples of embodiments of the present invention are described below with reference to a figure attached hereto. Dimensions of components and features in the figure are chosen for convenience and clarity of presentation and are not necessarily shown to scale. The figures is.

DETAILED DESCRIPTION OF EMBODIMENTS

Figure 1:
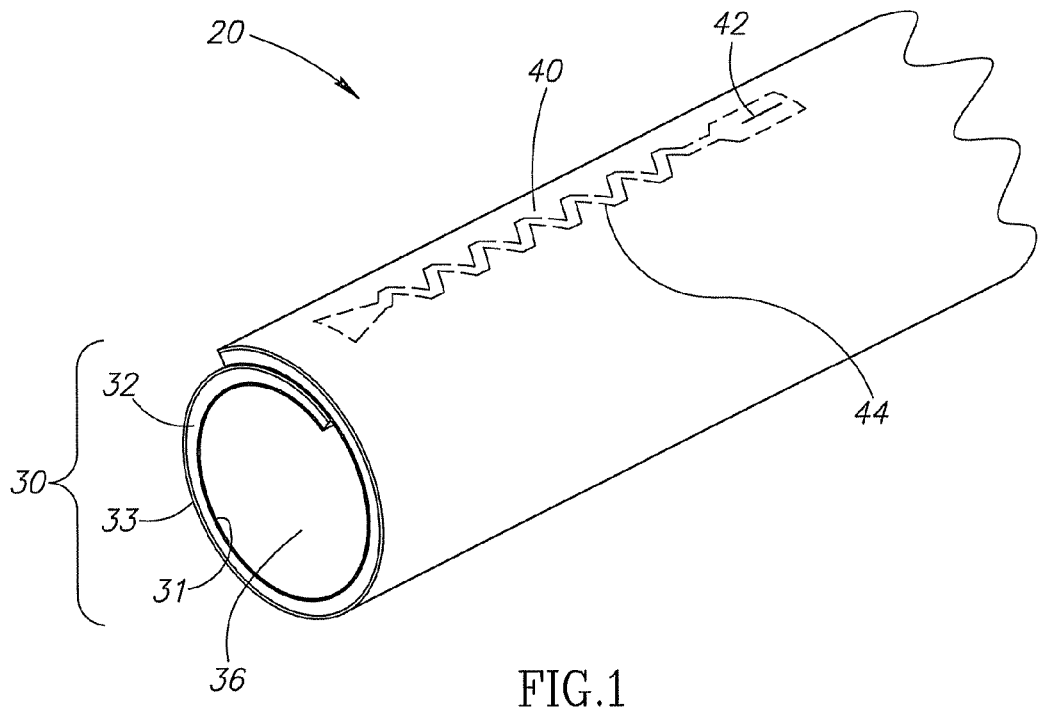
FIG. 1 schematically shows a biodegradable irrigation pipe formed having a core layer and protective layers, in accordance with an embodiment of the invention.

FIG. 1 schematically shows a cross section of a biodegradable irrigation pipe 20 in accordance with an embodiment of the invention.

Irrigation pipe 20 optionally comprises a relatively thin flexible wall 30 formed having a biodegradable core layer 32 that provides body and mechanical strength to irrigation pipe 20 sandwiched between an inner protective layer 31 and an outer protective layer 33. Inner and outer protective layers 31 and 33 have thickness and are formed from a material or materials that are relatively non-biodegradable so that for a duration of a growing season for which irrigation pipe 20 is intended to be used, the layers protect core layer 31 from damage that might render the pipe unusable. Irrigation pipe 20 is optionally formed with inline emitters 40 schematically shown in dashed lines having outlet ports 42 from which water and optionally nutrients flowing in the irrigation pipe exit the pipe and are supplied to plants being irrigated using the pipe. Outlet ports 42 are optionally connected to a lumen 36 of irrigation pipe 20 by a labyrinth 44.

Irrigation pipe 20 is optionally formed by forming protective layers 31 and 33 on a web of material from which core layer 32 is formed. Outlet ports 42 and labyrinths 44 are formed in the web by any of various appropriate puncturing and embossing methods known in the art, The web is then folded on itself to provide an overlap region along edges of the web and the overlap region bonded or welded to form the irrigation pipe. In some embodiments of the invention, irrigation pipe 20 is formed from a web made from material from which core material 32 is made using a folding, bonding and/or welding process in accordance with any of various production methods known in the art. Protective layers 31 and 32 are then optionally formed on the pipe using a suitable laminating, dipping and/or spraying process.

In some embodiments of the invention, core layer 32 is formed from at least one of the following biodegradable materials: polylactic acid (PLA); modified PLA; plasticised PLA; PLA copolymers; starch copolymer; thermoplastic starch; PHA; polymerized seed oils; aliphatic polyesters polymers; and/or aliphatic/aromatic polyesters copolymers. The noted materials may be used by themselves or in combinations of two or more of the materials and/or in combination with other materials to form the core layer. Optionally, the glass transition temperature of the material forming the core layer is below the temperature at which the irrigation pipe will be used. Optionally, at least the core layer is compostable in accordance with European norm EN 13432.

In some embodiments of the invention, protective layers 31 and 33 are thin layers of a suitable inorganic material such as titania or silica. In some embodiments of the invention, the protective layers are formed from at least one of a polyolefin such as a polyethylene (CH3-(CH2)n-CH3), a fluoropolymer such as PTFE (CF3-(C2F4)$_n$-CF3), a siloxane such as dimethylsiloxane (SiO(CH3)3-(SiO2(CH3)2)n-(SiO(CH3)3), an acrylic and/or a polyester. In some embodiments of the invention, protective layers 31 and 33 are hydrophobic layers that protect core layer 32 by a Lotus effect, in which the protective layers prevent wetting of the core layer. Hydrophobic layers may be formed by painting core layer 32 with a suitable paint or impregnating the core layer with a wax. A suitable paint is Silclean® 3700, a silicone-modified crosslinkable acrylate marketed by BYK-Chemie. A suitable material for impregnating the core layer with a wax is Lotusspray, an aerosol of polypropylene containing wax nanoparticles marketed by BASF.

Figure 2:
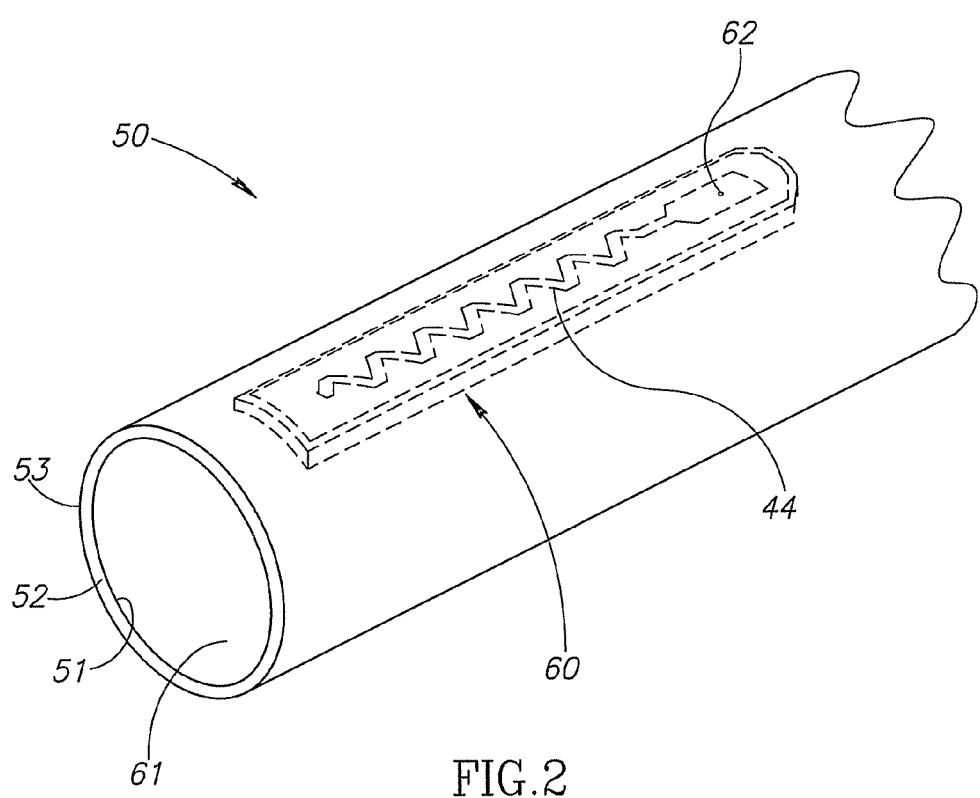
FIG. 2 schematically shows another biodegradable irrigation pipe formed having a core layer and protective layers, in accordance with another embodiment of the invention.

FIG. 2 schematically shows a cross section of another biodegradable irrigation pipe 50 in accordance with an embodiment of the invention. Irrigation pipe 50 is not formed from a web that is folded over to provide an overlap region, which is bonded or welded to form a pipe. Instead, pipe 50 is optionally formed by extruding a core layer 52 directly in the form of a pipe and then forming protective layers 51 and 53 on the core pipe in a co-extrusion process or using a suitable laminating, dipping and/or spraying process. Inline emitters 60 (only one of which is shown) are optionally bonded or attached to an internal surface 61 of the pipe and outlet ports 62 formed using any of various methods known in the art. In accordance with embodiments of the invention, any of the materials used to produce core layer 32 and protective layers 31 and 33 in irrigation pipe 20 may be used to form core layer 52 and protective layers 51 and 53 respectively in irrigation pipe 50.

By way of a non binding numerical example and in accordance with an embodiment of the invention, core layers 32 and 52 in irrigation pipes 20 and 50 respectively may be formed from modified PLA and have a thickness of between about 100 to about 200 microns. Protective layers 31 and 33, and 51 and 53 are optionally formed from polyethylene and have thickness of between 10 and 50 microns. For the given core layer material and range of thickness, the core layers provide sufficient mechanical strength so that irrigation pipes 20 and 50 function satisfactorily for gauge pressures between about 10 and about 30 meters of water.

The inventors estimate that irrigation pipe 20 or 50 formed to the specifications of the above numerical example will function satisfactorily for substantially any length growing season until such time as their respective protective layers 31 and 33 or 51 and 53 are appropriately breached. Optionally, the protective layers are breached by shredding and/or grinding up the irrigation pipes. Following breaching, the core layer 32 or 52 will start to biodegrade. If the core layer has a glass transition temperature above the temperature at which it is used, after breaching of the protective layers the pipe may advantageously be deposited in a suitable compost facility for degradation. If the core layer has a glass transition temperature below the temperature at which it is used the pipe may advantageously be deposited left in the ground of the field in which it is used to biodegrade. The inventors estimate that about 90% of core layer 32 or 52 of irrigation pipe 20 or 50 will biodegrade in a period of up to about 6 months after their protective layers are breached and the pipe deposited in a compost facility maintaining suitable compositing conditions and temperature.

In the description and claims of the application, each of the words "comprise" "include" and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed is:

1. An irrigation pipe having a wall comprising:
    a core layer formed from a biodegradable material; and
    at least one non-biodegradable protective layer formed on the core layer.

2. An irrigation pipe according to claim 1 wherein the core layer comprises a plurality of sub layers formed from different bio-degradable materials.

3. An irrigation pipe according to claim 1 wherein the at least one protective layer comprises two protective layers.

4. An irrigation pipe according to claim 1 wherein the core layer is formed from at least one material from the group of materials consisting of: polylactic acid; modified polylactic acid; plasticised polylactic acid; polylactic acid copolymers; starch copolymer; thermoplastic starch; PHA; polymerized seed oil; an aliphatic polyester polymer; and/or an aliphatic/aromatic polyester copolymer.

5. An irrigation pipe according to claim 1 wherein the core layer has a thickness greater than about 100 microns.

6. An irrigation pipe according to claim 1 wherein the core layer has a thickness less than about 200 microns.

7. An irrigation pipe according to claim 1 wherein the at least one protective layer has a thickness greater than about 10 microns.

8. An irrigation pipe according to claim 1 wherein the at least one protective layer has a thickness less than about 50 microns.

9. An irrigation pipe according to claim 1 comprising at least one protective layer on both sides of the biodegradable layer.

10. An irrigation pipe according to claim 1 wherein the at least one protective layer is formed from at least one material from the group of materials consisting of: a fluoropolymer, a siloxane, and/or an acrylic.

11. An irrigation pipe according to claim 10 wherein the fluoropolymer comprises PTFE ($CF_3$-$(C_2F_4)_n$-$CF_3$).

12. An irrigation pipe according to claim 10 wherein the siloxane comprises dimethylsiloxane ($SiO(CH_3)_3$-$(SiO_2(CH_3)_2)_n$-$(SiO(CH_3)_3)$).

13. An irrigation pipe according to claim 1 wherein the at least one protective layer is formed from an inorganic material.

14. An irrigation pipe according to claim 13 wherein the at least one protective layer comprise titania.

15. An irrigation pipe according to claim 13 wherein the at least one protective layer comprise silica.

* * * * *

UNITED STATES PATENT AND TRADEMARK OFFICE
Certificate

Patent No. 7,862,873 B2            Patented: January 4, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tsipora Yankovitz, Kazir (IL); Abraham Schweitzer, D.N. Negev (IL); Ana Lea Dotan, Ramat Gan (IL); and Amos Ophir, Zichron Yaakov (IL).

Signed and Sealed this Twenty-first Day of February 2012.

RENA DYE
*Supervisory Patent Examiner*
Art Unit 1782
Technology Center 1700